(12) United States Patent
Jokela

(10) Patent No.: US 6,654,663 B1
(45) Date of Patent: Nov. 25, 2003

(54) AUTOMATED ASSEMBLY LINE

(75) Inventor: Markku Jokela, Virkkala (FI)

(73) Assignee: PMJ automec Oyj, Virkkala (FI)

( * ) Notice: Subject to any disclaimer, the term of this patent is extended or adjusted under 35 U.S.C. 154(b) by 0 days.

(21) Appl. No.: 09/623,586

(22) PCT Filed: Mar. 4, 1999

(86) PCT No.: PCT/FI99/00171

§ 371 (c)(1),
(2), (4) Date: Oct. 30, 2000

(87) PCT Pub. No.: WO99/46191

PCT Pub. Date: Sep. 16, 1999

(30) Foreign Application Priority Data

Mar. 9, 1998 (FI) .................................................. 980536

(51) Int. Cl.$^7$ ................................................ G07F 7/00
(52) U.S. Cl. ...................... 700/230; 700/217; 700/218; 700/229; 700/228; 198/358
(58) Field of Search ................ 700/230, 217, 700/218, 229, 228; 198/358

(56) References Cited

U.S. PATENT DOCUMENTS

| | | | |
|---|---|---|---|
| 4,519,491 A | | 5/1985 | Prodel et al. |
| 4,591,991 A | * | 5/1986 | Sticht .......................... 364/478 |
| 4,626,160 A | | 12/1986 | Shiomi et al. |
| 4,646,245 A | | 2/1987 | Prodel et al. |
| 4,766,547 A | * | 8/1988 | Moderry et al. ............. 364/478 |
| 4,787,496 A | | 11/1988 | Prodel et al. |
| 4,827,395 A | * | 5/1989 | Anders et al. ............... 364/138 |
| 4,832,171 A | | 5/1989 | Prodel |
| 4,928,806 A | * | 5/1990 | Anderson et al. ........... 198/345 |
| 4,950,118 A | * | 8/1990 | Mueller et al. .............. 414/274 |
| 5,193,973 A | * | 3/1993 | Tubke ...................... 414/796.9 |
| 5,205,026 A | | 4/1993 | Sticht |
| 5,341,130 A | * | 8/1994 | Yardley et al. .......... 340/825.06 |
| 6,061,607 A | * | 5/2000 | Bradley et al. .............. 700/216 |
| 6,125,306 A | * | 9/2000 | Shimada et al. ............. 700/217 |

FOREIGN PATENT DOCUMENTS

| | | | | |
|---|---|---|---|---|
| AT | 390 423 | | 4/1983 | |
| DE | 35 21 285 | | 6/1985 | |
| DE | 3737750 | | 4/1989 | |
| FR | 2 581 629 | | 5/1986 | |
| GB | 2 040 244 A | | 12/1979 | |
| GB | 2 174 686 A | | 4/1986 | |
| GB | 2 174686 A | * | 11/1986 | ............ B61D/47/00 |
| GB | 234 256 A | * | 3/2000 | ............ H05K/13/02 |
| IE | 980703 | * | 1/1999 | ............ H05K/13/02 |
| JP | 1 412 458 | | 12/1972 | |
| WO | WO 86/07554 | * | 12/1986 | ............. B23Q/7/14 |
| WO | WO8449075 | * | 11/1998 | ............ B65G/1/137 |

* cited by examiner

Primary Examiner—Donald P. Walsh
Assistant Examiner—Michael E Butler
(74) Attorney, Agent, or Firm—Merchant & Gould, P.C. (23552)

(57) ABSTRACT

An assembly line comprising a number of pallets (1) carrying electronic components for assembly, provided with individual RF-tags (2) containing stored product information, a main conveyor (3) in the shape of an endless loop, conveying pallets (1); assembly stations (4) spaced along the main conveyor. Each station is equipped with a reading device (6) for reading the RF-tags and a data processing apparatus controlling the work station operations, depending on the data read off the RF-tag; an automatic storage system (7) placed in the vicinity of workstations (4) comprising a number of storage devices (8), as well as transfer means (9) feeding pre-selected components from a pre-selected storage device to the assembly stations.

9 Claims, 3 Drawing Sheets

AUTOMATED ASSEMBLY LINE

The present invention relates to an assembly line as defined in the preamble of claim 1.

In prior arc, an electronics industry assembly line is known which comprises a number of pallets fitted to receive components of a product co be assembled. Each pallet is provided with an RF-tag carrying stored information about the product co be assembled Furthermore, the assembly line comprises a conveyor constructed in the shape of an endless loop and fitted to convey the pallets. Moreover, the assembly line comprises assembly work stations disposed along the main conveyor so that they can receive a pallet from the main conveyor and carry out assembly operations on the product on the pallet within the framework of the working area of the work station. Each assembly work station is provided with a reading device for reading the contents of the RF-tag before carrying out the assembly operation. Based on the data read from the RF-tag, a data processing device controls the assembly work station, causing it to perform a number of predetermined assembly operations, such as placing a component on the product and/or on the pallet. This type of flexible modular assembly lines are manufactured e.g. by Prodel Technologies, Carlepont, France. The working principles and details of the assembly line are described e.g. in Prodel patents U.S. Pat. Nos. 4,519,491, 4,646,245, 4,787,496 and 4,832,171 etc.

Figure 1:
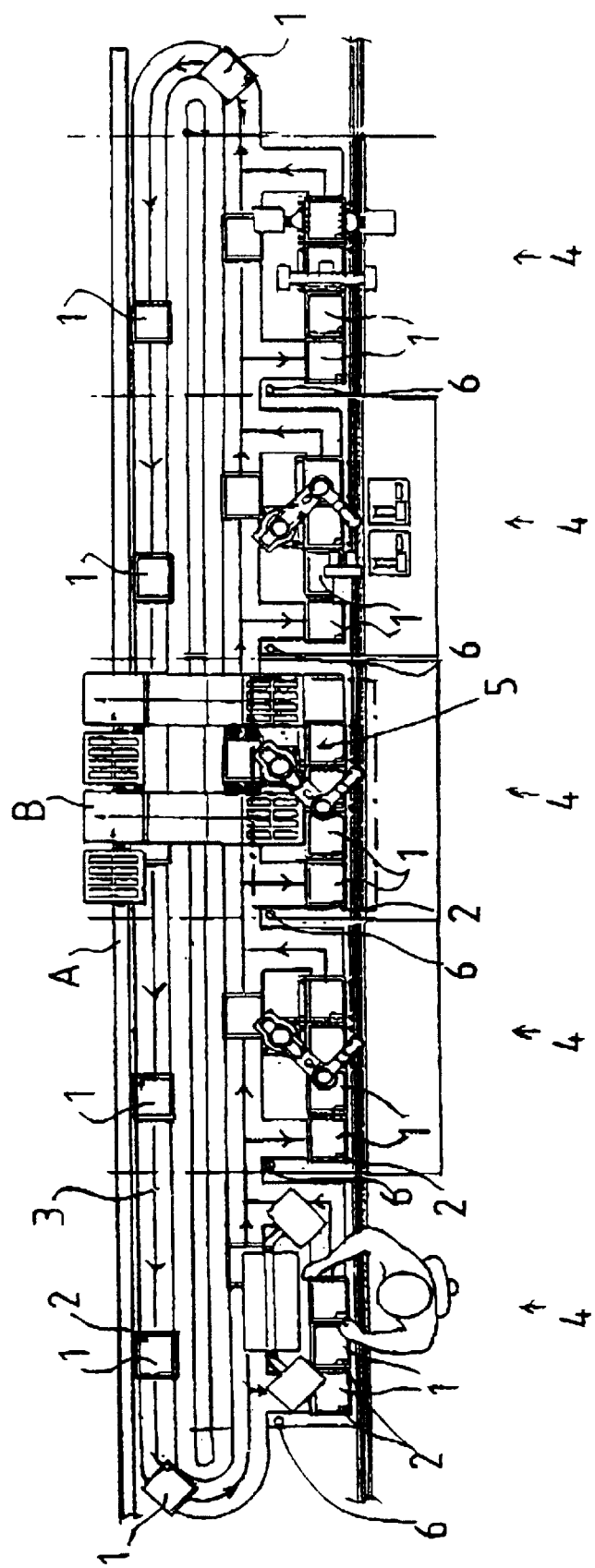

In a known assembly line system like this, an example of which is illustrated by the diagram in FIG. 1, the supply of components to the working area of the robot at the work station at the middle of the line is implemented by having a number of components carried on pallets on a storage conveyor A parallel co the main conveyor, and when a given component is needed, the entire pallet is moved by means of a transverse transfer gear B into the picking area of the robot.

The problem is chat the robot or, in the case of a manual work station, the worker has a specific limited working area, where the pallets cake up a large space if they are brought there. The working area of a conventional robot can only accommodate a very limited number of pallets and their feed devices, e.g. only two as in FIG. 1. If there is a larger number of component variants to be assembled by the same robot, it is difficult to supply them on pallets to the working area of the robot. In series production with small series there may be different production lots simultaneously on the assembly line, so such a situation is likely c develop in-process inventories and buffers. Moreover, a change of series cannot be flexibly accomplished without the operator's intervention.

The object of the present invention is to eliminate the drawbacks described above.

The assembly line of the invention is characterised by what is presented in claim 1.

According to the invention, the assembly line comprises an automatic storage system disposed in the vicinity of the assembly work station, said automatic storage system comprising a number of storage devices, transfer means disposed between the storage devices and the assembly work station for supplying a predetermined component from a predetermined storage location co the working area of the assembly work station on the basis of data read from the RF-tag.

The invention provides the advantage that the space available in the working area of the assembly work station constitutes no limitation of the number of components chat can be assembled in the work station. The supply of components to the working area does not require a buffer nor is one formed in the working area as the components are fetched from the storage device as necessary. A large amount of different components can be supplied to and handled by the same work station.

Furthermore, the work station allows very small production series. A change of series requires no action on the operator's part.

I an embodiment of the assembly line, the storage device comprises a number of pallets placed over each other, each carrying a number of components. The transfer means comprise a component conveyor extending from the vicinity of the storage device to the working area of the assembly work station, and a manipulation arm or equivalent provided with a gripping device for gripping a component on a pallet and moving it onto the component conveyor.

In an embodiment of the assembly line, the assembly line comprises a carriage fitted to receive and support the component; and a guide for forming a track for the carriage.

In an embodiment of the assembly line, the assembly line work station is a manual work station for a worker for the execution of manual assembly operations on a product on a pallet.

In an embodiment of the assembly line, the work station is an assembly robot cell fitted to perform an automatic assembly operation on a product on a pallet.

In an embodiment of the assembly line, the assembly line comprises a side conveyor disposed in the area of the assembly work station and branching out from the main conveyor co receive a pallet from the main conveyor and convey it to the working area of the work station for an assembly operation and deliver the pallet back to the main conveyor.

In an embodiment of the assembly line, the assembly robot cell comprises a robot provided with a gripping device designed to grip a component on a carriage in the working area and move it from the carriage to the product being assembled on the pallet.

In an embodiment of the assembly line, the storage device comprises a shelf means provided with supporters on which the pallets are arranged one over the ocher and an elevating gear for successively moving the supporters in a vertical direction so that the pallets are moved upwards, and for moving the supporters for an upper and a lower pallet placed successively over each other with respect to each other when facing the manipulation arm so as to form an interspace between the upper and lower pallet into which the manipulation arm together with the gripping device can be inserted in order to pick up a component from the lower pallet.

In an embodiment of the assembly line, the assembly work station has been organised to do assembly work consisting of mounting a component having several variants on a product. The automatic storage system comprises a storage device for each variant, so that the pallets of each different storage device carry the same variant.

Figure 2:
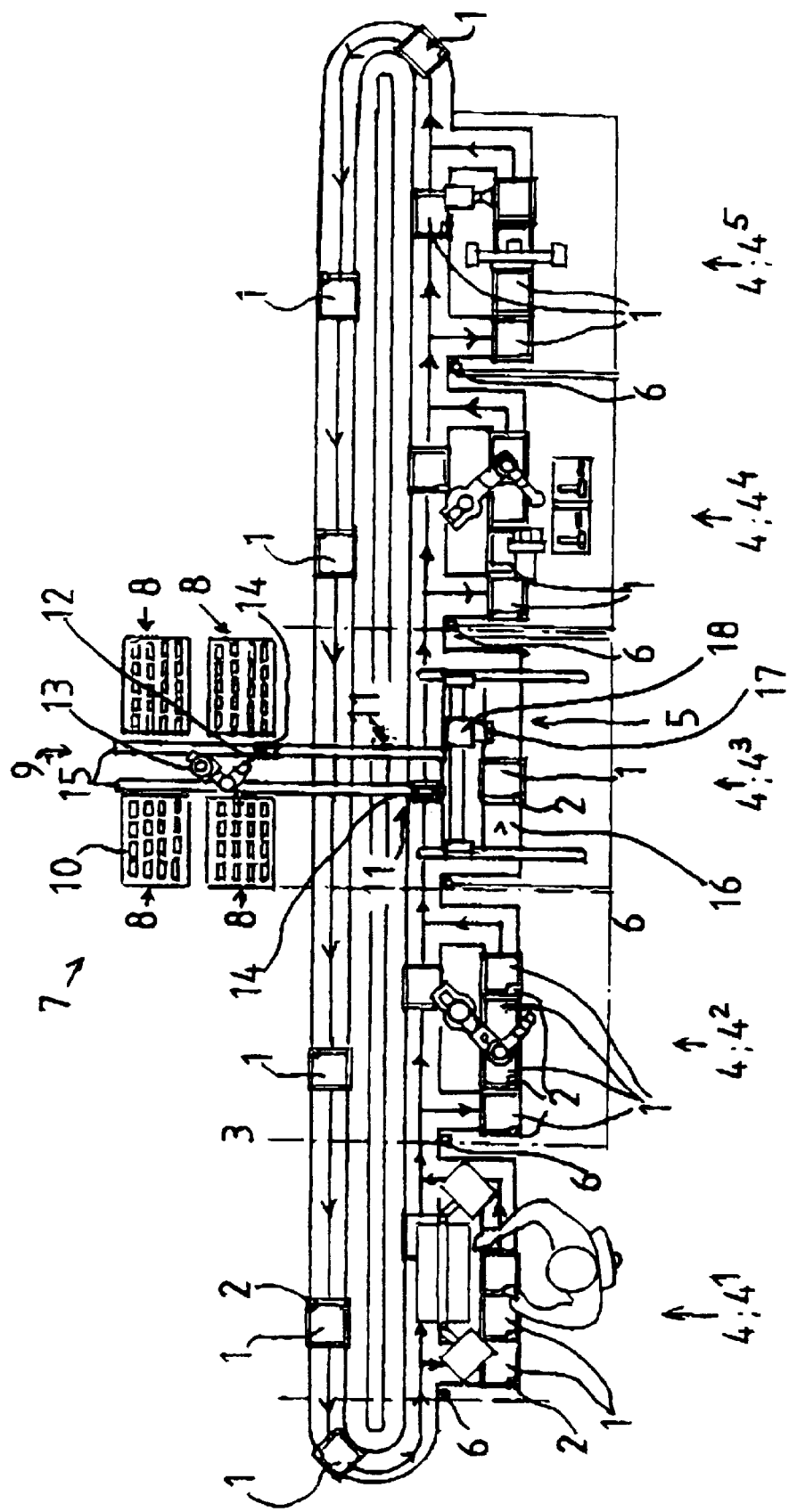

In the following, the invention will be described in detail by the aid of a few examples by referring to the attached drawing, wherein FIG. 1 presents a diagrammatic view of the layout of a prior-art assembly line, FIG. 2 presents a diagrammatic lay-out view of an embodiment of the assembly line of the invention.

Figure 3:
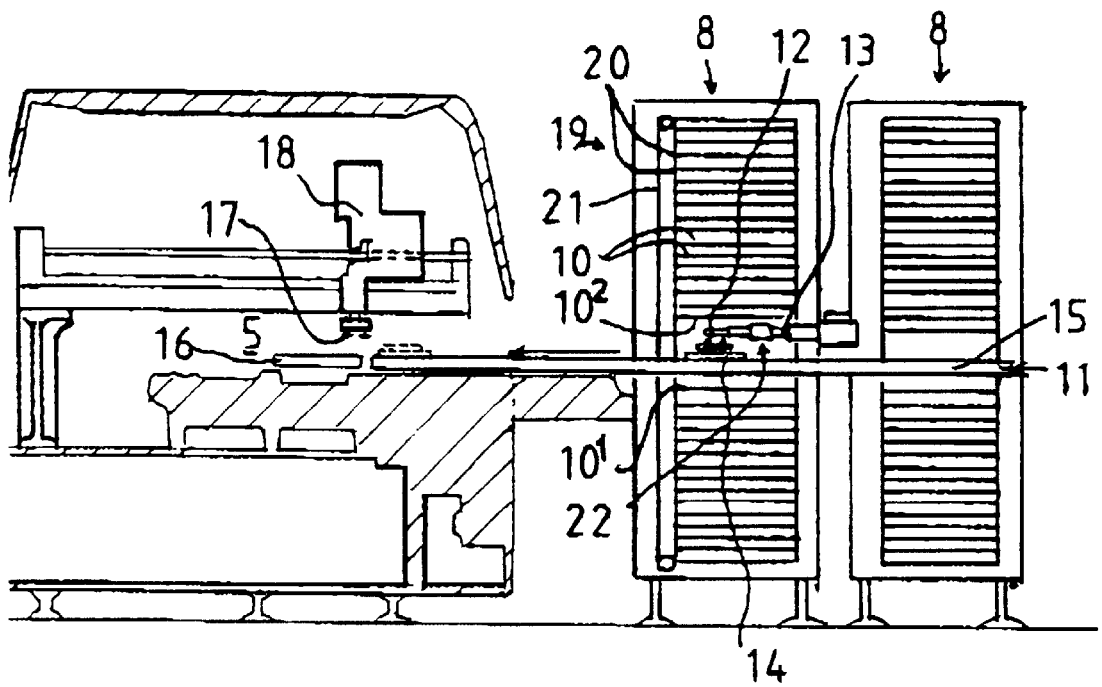

FIG. 3 presents a lateral view of a diagrammatic section III—III of FIG. 2, and

Figure 4:
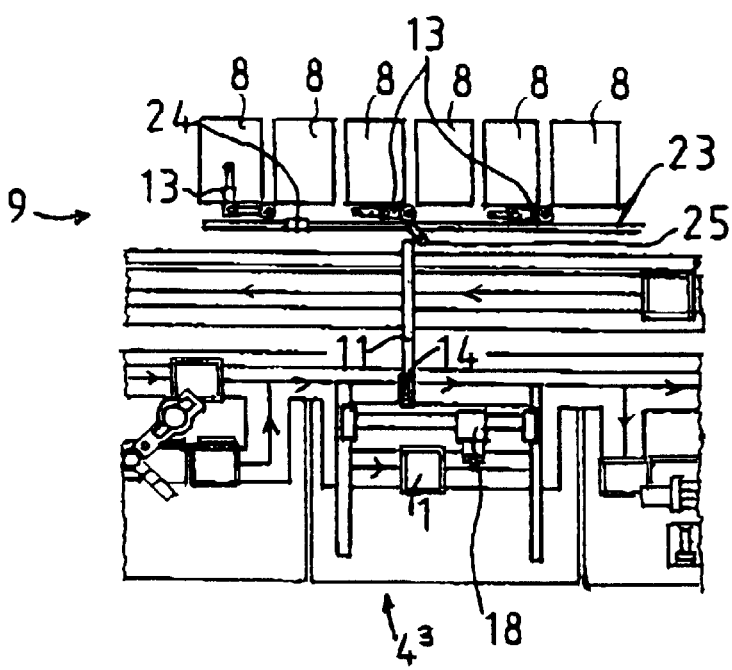

FIG. 4 presents a diagrammatic lay-out view of another embodiment of the assembly line of the invention.

FIG. 2 presents a lay-out view of an assembly line for electronics industry The assembly line comprises a number of pallets 1 fitted to receive components of the product to be assembled, in other words, the product is assembled on the pallet 1 automatically or manually. Each pallet is provided with an RF-tag 2 containing stored information about the product being assembled. The information may consist of e.g. a product code, on the basis of which it is possible to read from a database in a computer a list of components for the product as well as information as to which work station is co be used co assemble certain components. Furthermore, the line comprises a main conveyor 3 constructed in the shape of an endless loop for conveying the pallets 1. Disposed side by side along the lower portion of the track of the main conveyor 3 in the figure are different assembly work stations 4; $4^1$, $4^2$, $4^3$, $4^4$, $4^5$. The assembly line in the example comprises one manual work station $4^1$ while the other work stations $4^2$, $4^3$, $4^4$, $4^5$ are robot work stations.

At each work station 4 there is a side conveyor 6 branching out from the main conveyor and running in the same direction with the main conveyor. The side conveyor 6 functions as a buffer for the work station. It receives the pallet 1 from the main conveyor 3 and conveys it to the working area S of the assembly the work station for an assembly operation, and after the operation has been completed, the side conveyor delivers the pallet 1 back onto the main conveyor 3. It the buffer of the work station, i.e. the queue of pallets 1 waiting for an operation on the side conveyor 6 is full, then a new pallet 1 destined for the work station will continue along the return track, which is the upper portion of the track in the figure, back co the beginning of the line, which in the figure is the left-hand end of the conveyor, the conveying direction being the anti-clockwise direction.

The assembly work stations 4 carry out various assembly operations on the product placed on the pallet 1. Each assembly work station 4 is provided with a reading device 6 which communicates with the RF-tag 2 and reads its contents before executing the operation. Based on the data read in the RF-tag a work station-specific data processing apparatus controls the assembly work station, causing it co perform on the product a number of predetermined assembly operations, such as placing a component on the product and/or on the pallet. In addition, each work station is provided with means for indicating chat the operation has been completed and means for modifying the contents of the RF-tag after completion of the operation.

Assembly work station $4^3$ is an assembly robot cell which performs an automatic assembly operation on the product on the pallet 1. This work station $4^3$ has been designed to carry our assembly of a component having several variants on the product on the pallet. The assembly robot cell $4^3$ comprises a robot 18 provided with a gripping device 17 for gripping a component on a carriage 14 and moving it from the carriage co the product on the pallet 1. The assembly line comprises an automatic storage system 7 serving assembly work station $4^3$. In the example in FIG. 2, the automatic storage system 7 comprises four storage devices 8. Moreover, it comprises transfer means 9 disposed between the storage devices 8 and the assembly work station 4. Based on the data read from the RF-tag 2, the data processing apparatus controls the transfer means 9 of the automatic storage system 7, causing them to supply a certain required component from the storage device 8 storing the component in question to the picking area of the robot 18 of the assembly work station 4.

As is also shown in FIGS. 2 and 3, the storage device 8 comprises a number of pallets 10 placed one over the other, each carrying a number of components arranged in a matrix formation. The transfer means 9 comprise a component conveyor 11 extending from the vicinity of the storage device 8 to the working area 5 of the work station 4 The component conveyor 11 comprises a carriage 14, which is fitted co receive the component and support it, and a guide 15 forming the track of the carriage. In FIG. 2, the guide extends transversely across the main conveyor 3.

Placed in the immediate vicinity of the storage device 8 is a manipulation arm 13 provided with a gripping device 12. The manipulation arm grasps a component on the pallet 10 and takes it to the component conveyor 11. The system has a storage device 8 for each different component variant so that the pallets 10 of each different storage device 8 carry the same component variant In the example in FIG. 2 there are four component variants, but their number is not limited in any way. For the sake of simplicity the example in FIG. 2 only presents one manipulation arm 13, but in practice it will be advantageous to provide each storage device 8 with a separate manipulation arm 13 serving the particular storage device. Moreover. the example in FIG. 2 comprises two component conveyors 11 parallel co each other.

Referring co FIG. 3, the storage device 8 comprises a shelf means 19 comprising a number of supporters 20 on which the pallets 10 are arranged one over the other. Using an elevating gear 21, the supporters can be moved successively in a vertical direction so that the pallets 10 move upward. The pallets 10 can be loaded with components from the lower part of the shelf means 19, from where they are moved upward as soon as the manipulation arm 13 has unloaded them. Unloaded pallets 10 can be removed from the upper part of the shelf means 19. Supporters for a lower pallet $10^1$ and an upper pallet $10^2$ placed successively one over the other, when level with the manipulation arm 13 turning horizontally above the component conveyor, can be moved in relation to each ocher so that an interspace 22 is formed between the lower and upper pallets, permitting the manipulation arm 13 with the gripping device 12 co be inserted into said space 22 in order to pick up a component from the lower pallet $10^1$.

FIG. 4 presents another lay-out example in which six storage devices 8 for six different component variants have been arranged in a row parallel co the main conveyor 3. The difference to the assembly line in FIG. 2 is chat the transfer means 9 between the storage devices 8 and the main conveyor 3 comprise an auxiliary conveyor 23 parallel to the main conveyor. The auxiliary conveyor is provided with a transfer table 24 for receiving components from the manipulators 13, which pick them from the storage devices 8. The transfer table 24 carries the component to a point on the auxiliary conveyor that lies in the picking area of a transfer manipulator 25. The transfer manipulator 25 takes the component and places it onto the carriage 14 of the component conveyor 11, which transports it further to the working area of the robot 18 in the work station, where it is then mounted on the product.

The invention is not restricted co the examples of its embodiments described above, but many variations are possible within the scope of the inventive idea defined fined by the claims.

What is claimed is:

1. Assembly line for electronics industry, said assembly line comprising a number of pallets (1) fitted to receive components of a product to be assembled, each pallet being provided with an RF-tag (2) containing stored information about the product being assembled; a main conveyor (3) constructed in the shape of an endless loop and fitted to convey the pallets (1); assembly work stations (4; $4^1$,$4^2$, $4^3$ . . . ) disposed along the main conveyor for receiving pallets from the main conveyor and carrying out assembly work operations on the product on the pallet in the framework of the working area (5) of the work station, each one of said assembly work stations being provided with a reading device (6) for reading the contents of the RF-tag before execution of the operation and a data processing apparatus for controlling the assembly work station on the basis of the data read from the RF-tag so as to cause the work station to execute a number of predetermined assembly operations, such as placing a component on at least one of the product or the pallet, wherein the assembly line comprises an automatic storage system (7) disposed in a vicinity of an assembly work station (4), said automatic storage system comprising a number of storage devices (8), and transfer means (9) disposed between the storage devices and the assembly work station for supplying a predetermined component from a predetermined storage device to the working area of the work station on the basis of the data read from the RF-tag, the transfer means (9) including a component conveyor (11) extending from a vicinity of the storage device (8) to the working area (5) of the assembly work station (4).

2. Assembly line as defined in claim 1, wherein the storage device (8) comprises a number of pallets (10) placed over each other, each carrying a number of components, and a manipulation arm (13) or the like provided with a gripping device (12) for gripping a component on a pallet and moving it onto the component conveyor (11).

3. Assembly line as defined in claim 1, further comprising a component conveyor including a carriage (14) fitted to receive and support the component; and a guide (15) for forming a track for the carriage.

4. Assembly line as defined in claims 1, wherein the assembly work station ($4^1$) is a manual work station for a worker, designed for the execution of manual assembly operations on a component on a pallet (1).

5. Assembly line as defined in claim 3, wherein the work station ($4^3$) is an assembly robot cell fitted to perform an automatic assembly operation of a product wherein the product is on a pallet (1).

6. Assembly line as defined in claim 1, wherein the assembly line comprises a side conveyor (16) disposed in the area of the assembly work station (4) and branching out from the main conveyor (3), designed to receive a pallet (1) from the main conveyor and convey it to the working area (5) of the work station for an assembly operation and to deliver the pallet back to the main conveyor.

7. Assembly line as defined in claim 5, wherein the assembly robot cell ($4^3$) comprises a robot (18) provided with a gripping device (17) for gripping a component on the carriage (14) in the working area (5) and moving it to the product being assembled on the pallet (1).

8. Assembly line as defined in claims 2, wherein the storage device (8) comprises a shelf means (19) provided with supporters (20) on which the pallets (10) are arranged one over the other; and an elevating gear (21) for successively moving the supporters in a vertical direction so that the pallets are moved upwards, and for moving the supporters for successive lower ($10^1$) and upper ($10^2$) pallets placed over each other with respect to each other when facing the manipulation arm (13) so as to form an interspace (22) between the lower and upper pallets into which the manipulation (13) arm together with the gripping device (12) can be inserted in order to pick up a component from the lower pallet ($10^1$).

9. Assembly line as defined in claim 2, wherein the assembly work station (4) has been arranged to do assembly work consisting of mounting a component having several variants on a product; and that the automatic storage system comprises a storage device (8) for each variant, so that the pallets (10) of each different storage device carry the several variants.

* * * * *